US 6,739,443 B2

(12) United States Patent
Fernandez

(10) Patent No.: US 6,739,443 B2
(45) Date of Patent: May 25, 2004

(54) DOUBLE-ACTING BAULKRING-TYPE SYNCHRONIZER

(75) Inventor: Josevaldo Roberto Fernandez, Salto-SP (BR)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/053,420

(22) Filed: Nov. 6, 2001

(65) Prior Publication Data
US 2002/0063030 A1 May 30, 2002

(30) Foreign Application Priority Data
Nov. 27, 2000 (BR) .............................. 0006744

(51) Int. Cl.[7] .............................................. F16D 11/00
(52) U.S. Cl. ............................. 192/53.341; 192/53.34; 192/53.31
(58) Field of Search ................. 192/53.34, 53.341, 192/53.361, 53.31, 48.91, 339

(56) References Cited

U.S. PATENT DOCUMENTS

| 3,741,358 A | * | 6/1973 | Magnier | 192/53.34 |
| 4,280,370 A | * | 7/1981 | Schreiner | 74/339 |
| 4,712,662 A | * | 12/1987 | Elverdam | 192/53.341 |
| 4,901,835 A | | 2/1990 | Frost | 192/53 F |
| 5,022,506 A | | 6/1991 | Philippe | 192/53 G |
| 5,267,636 A | * | 12/1993 | Fielding | 192/53.34 |
| 5,588,516 A | * | 12/1996 | Braun et al. | 192/48.91 |
| 5,887,688 A | * | 3/1999 | Ploetz et al. | 192/53.341 |
| 6,186,301 B1 | * | 2/2001 | Schwuger et al. | 192/53.341 |

FOREIGN PATENT DOCUMENTS

GB 2029519 3/1980

* cited by examiner

Primary Examiner—Charles A Marmor
Assistant Examiner—Eric M. Williams
(74) Attorney, Agent, or Firm—Paul S. Rulon; Kevin M. Hinman; Howard D. Gordon

(57) ABSTRACT

A double-acting baulkring-type synchronizer (18) includes fiction surfaces (24,48 and 26,50) and jaw teeth and jaw teeth (28,54,30,56) for synchronizing and positively connecting forward and reverse gears (14,16) to a shaft (12). Initial engaging movement of a shift sleeve (34) from a neutral position activates pre-energizers (52 or 100) effect engagement of the friction surfaces for engaging blocker surfaces (44a,54a,46a,56a) that prevent asynchronous engagement of the jaw teeth. The pre-energizers include clearances and centering forces to prevent momentary engagement of the friction surfaces associated with the reverse gear and the forward gear when the shift sleeve is moved back to the neutral position from a position of engaged the jaw teeth (28,54 or 30,56) associated respectively with the forward and reverse gears.

14 Claims, 4 Drawing Sheets

DOUBLE-ACTING BAULKRING-TYPE SYNCHRONIZER

FIELD OF THE INVENTION

This invention relates to a pre-energizer for a double acting baulkring-type synchronizer.

BACKGROUND OF THE INVENTION

Baulkring-type synchronizers for use in multi-ratio transmissions are well known. Such synchronizers often include pairs of friction and jaw members for respectively synchronizing and positive clutching axially spaced apart gears to a shaft, a hub rotatably fixed to the shaft and having external spline teeth slidably receiving internal spline teeth of a shift sleeve, baulkrings having blocker teeth for arresting engaging movement of the shift sleeve until synchronization is reached and for transferring a shift force from the sleeve to friction members. Such synchronizers also often include pre-energizers having a member that is moved axially against spring force for effecting initial engagement the friction members in response to initial engaging movement of the shift sleeve.

However, when the shift sleeve is moved from a positive clutching engagement with one gear to a neutral position, the pre-energizer member may cause the friction members of the other gear to momentarily engage, thereby causing unnecessary and rapid ware of these friction surfaces. Shift sleeve movement from positive engagement with one gear to the neutral position may occur when both gears are forward drive gears but often occurs when one gear is a forward drive gear and the other is reverse drive gear. Since the relative rotational speeds of such forward/reverse gear arrangements is much greater than relative rotation of forward/forward gear arrangements, momentary engagement of the forward/reverse gears friction surfaces when shifting to neutral further increases rapid wear of these friction surfaces.

SUMMARY OF THE INVENTION

An object of this invention is to provide a baulkring-type synchronizer with an improved pre-energizer.

According to this invention, a double acting baulkring-type synchronizer selectively synchronizes and positive connects a shaft with either of axially spaced apart first and second drives that are disposed for relative rotation about an axis of the shaft and are axially fixed relative thereto. The synchronizer, as disclosed in GB-A-2 029 519 and which represents the pre-characterized of claim 1, includes a hub affixed to the shaft concentric to the axis and between the drives. The hub includes a radially extending web having axially oppositely facing sidewalls, an outer circumference having external splines, and a radially extending slot in the web extending through the outer circumference. First and second jaw teeth and first and second friction surfaces are respectively affixed to the first and second drives. A shift sleeve has internal splines slidably mating with the hub external splines and third and fourth jaw teeth respectively engagable with the first and second jaw teeth in response respectively to first and second shift forces applying axially engaging movement of the shift sleeve from a neutral position. First and second baulkrings are disposed on opposite sides of the web and respectively include third and fourth friction surfaces respectively engagable with the first and second friction surfaces to produce a synchronizing torque, and the first and second baulkrings respectively have first and second blocker surfaces. Third and fourth blocker surfaces are affixed axially relative to the shift sleeve. Pre-energizer means is for engaging the first and second friction surfaces respectively with the third and fourth friction surfaces in response to initial engaging movement of the shift sleeve by the shift forces for positioning the first and second blocker surfaces for engagement respectively with the third and fourth blocker surfaces to prevent asynchronous engagement of the first and second jaw teeth respectively with the third and fourth jaw teeth. The pre-energizer means includes a movable member axially disposed between first and second baulkring abutments and biased radially outward by spring means into a detent in the shift sleeve when the shift sleeve is in the neutral position. The detent is axially disposed between axially extending surfaces of the shift sleeve. A spring holder is disposed in the slot between the member and spring means, and has tabs slidably disposed on opposite sides of the web and ramp surfaces for centering the member thereon with a centering force determined by the angle of ramp surfaces and the force of the spring means. The detent has angled sidewalls for moving the member axially into contact with the first and second abutments in response respectively to the initial engaging movement of the shift sleeve with a force transmitting capacity greater than the centering capacity of the ramp surfaces and to move the member radially inward and onto either one of the axially extending surfaces to allow continued engaging movement of the shift sleeve for engaging the first and second jaw teeth respectively with the third and fourth jaw teeth in response to synchronization between on of the drives and the shaft.

The synchronizer is characterized by the spring holder including a platform disposed in and extending axially through the slot, the tabs embracing the web side walls in snug sliding relation, the member having axial spacing from the first and second baulkring abutments during the neutral position of shift sleeve, and the centering force provided by ramp surfaces and the axial spacing great enough to prevent movement of the member into engagement with the second abutment due to frictional forces between the member and the axially extending surfaces when the shift sleeve is moved toward the neutral position from an engaged jaw teeth jaw teeth position.

BRIEF DESCRIPTION OF THE DRAWINGS

The synchronizer of the invention is shown in the accompanying drawings in which:

FIGS. 11A–12B are enlarged views of two parts in the synchronizer of FIGS. 7–10.

DETAILED DESCRIPTION OF THE DRAWINGS

Figure 1:
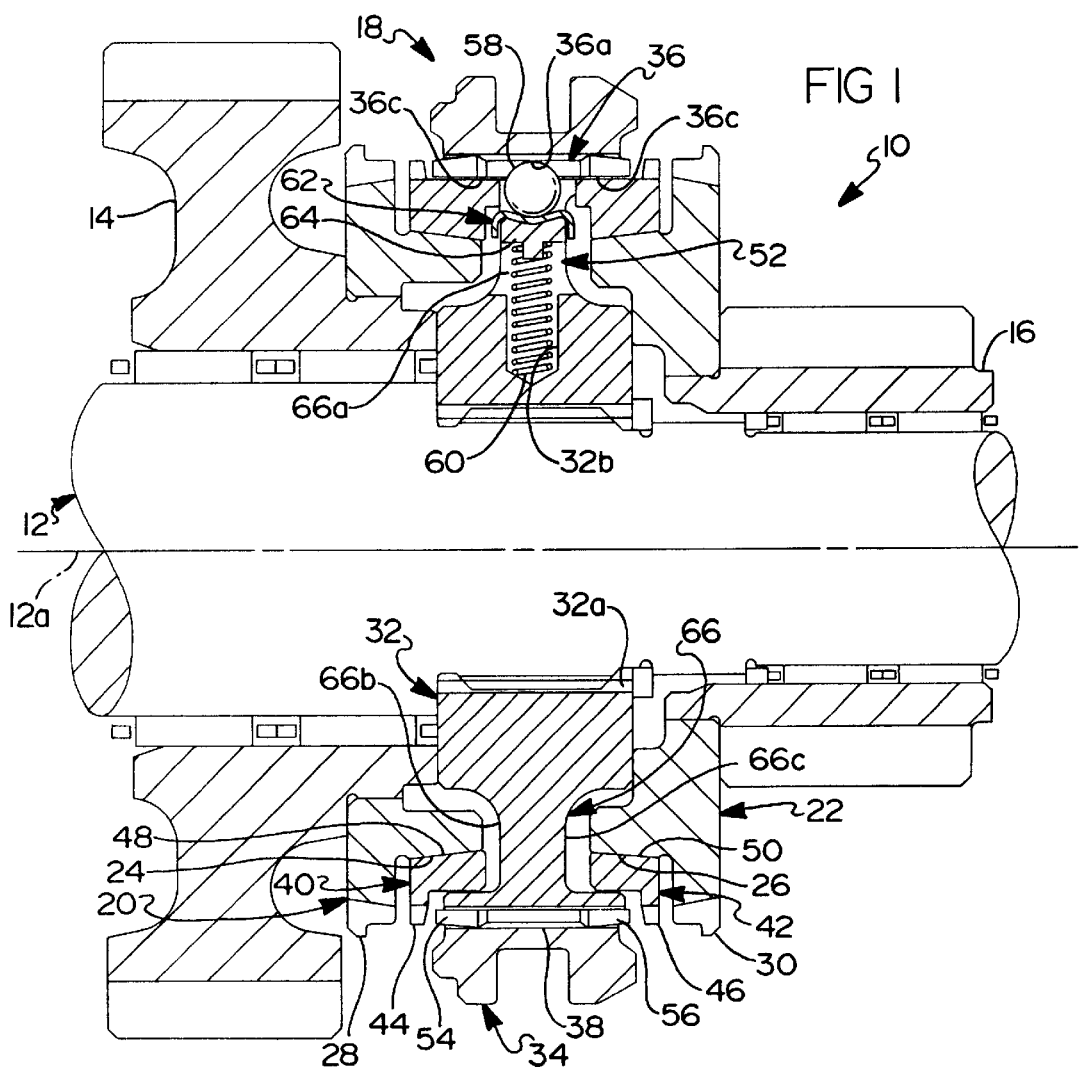
FIG. 1 is a sectional view of a double-acting baulkring-type synchronizer in a neutral position and disposed for rotation about the axis of a shaft.
Figure 2:
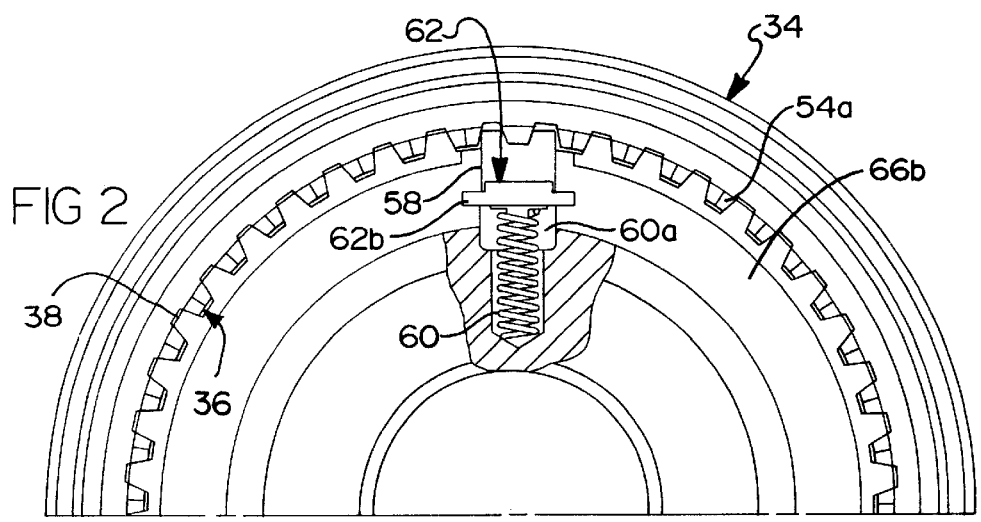
FIG. 2 is a rightward looking relief view of components FIG. 1 with a portion thereof in partial section.

The term "synchronizer" shall designate a clutch mechanism utilized to non-rotatably couple a selected gear or drive to a shaft by means of a positive clutch in which attempted engagement of the positive clutch is prevented until jaw teeth of the positive clutch are brought to substantially synchronous rotation by friction clutches associated with the jaw clutches.

Looking now at FIGS. 1–6B, therein is shown a gear and synchronizer assembly 10 which forms part of an unshown multi-ratio change speed transmission. Assembly 10 includes a shaft 12 mounted for rotation about a central axis 12a, axially spaced apart forward and reverse gears or drives 14,16 supported on the shaft for rotation relative thereto, and a double-acting baulkring-type synchronizer 18. The gears are secured against axial movement relative to the shaft in known manner.

The synchronizer clutch mechanism 18 includes annular drives 20,22 axially and rotatably affixed to gears 14,16 in known manner, gear friction surfaces 24,26 herein integral with drives 20,22, spline or jaw teeth 28,30 herein integral with drives 20,22, a hub 32 axially and rotatably affixed at a central opening 32a thereof to shaft 12, a shift sleeve 34, internal spline teeth 36 defined on a central opening of sleeve 34 and in constant mesh with external spline teeth 38 defined on the outer circumference of hub 32, baulkrings 40,42, blocker teeth sets 44,46 and friction surfaces 48,50 herein integral with baulkrings 40,42, and pre-energizer assemblies 52. Herein, the synchronizer includes three circumferentially spaced apart pre-energizers 52. The baulkrings are mounted for limited rotation relative to the hub in known manner.

As is readily seen, friction surfaces 24,48 and 26,50 pair up to define friction clutches for synchronizing the gears to the shaft prior to engagement of the jaw teeth. The friction surfaces are preferably cone shaped; however, other shapes may be used. A wide range of cone angles may be used. The friction surfaces may be defined by any of several known friction materials affixed to the base member, e.g., pyrolytic carbon friction materials such as disclosed in U.S. Pat. Nos. 4,700,823; 4,844,218 and 4,778,548 may be used. These patents are incorporated herein by reference.

Spline teeth 36,38 have axially extending flank surfaces which continuously mate in close sliding relation so that there is relatively no or little free play between shift sleeve 34 and hub 32. Opposite ends of internal splines 36 define jaw teeth 54,56 which mate with jaw teeth 28,30 to positive clutch the gears to the shaft. Axial ends of the jaw teeth include angled blocker surfaces 54a, 56a that cooperate with angled blocker surfaces 44a, 46a on the ends of blocker teeth sets 44,46 in known manner to prevent asynchronous engagement of the jaw teeth 54,56 respectively with jaw teeth 28,30. The flank sides of the jaw teeth may be provided with anti-back-out or locking angle features to prevent inadvertent disengagement of the jaw teeth. Details of this feature may be seen by reference to U.S. Pat. No. 4,727,968 which is incorporated herein by reference.

Each pre-energizer assembly 52 includes a detent 36a in one of the splines 36, a movable member 58, a coil spring 60 disposed at one end in a blind bore 32b in the hub, a spring holder 62 and spring guide 64 disposed in a slot 66a in the hub web 66 and positioned between the movable member 58 and the other end of the spring, and baulkring abutment surfaces 40a, 42a. Movable member 58 may be a roller or a ball, herein it is a roller that is axially spaced from the abutment surfaces when the shift sleeve is in the neutral position of FIG. 1. The spring holder, which is formed of sheet metal, includes a platform portion 62a extending axially through the slot 66a and tabs 62b and 62c defined by axially opposite ends of the platform extending radially inward by bending. The tabs embrace web sidewalls 66b, 66c in snug sliding relation for preventing substantially all axial movement between the spring holder and the web. The platform portion has ramp surfaces 62d, 62e defined by a radially inwardly curved surface of relatively smooth profile in a sectional plane parallel to the axis and having a profile substantially parallel to a plane normal to the axis when member 58 is a roller. The force of the spring acting on the platform biases the roller radially outward into the detent when the shift sleeve is in the neutral position of FIG. 1. The ramp surfaces center the roller with a centering force determined by the angles of the ramp surfaces and the force of the spring. Herein, the ramp surface angles are about 15 degrees. The detent has angled sidewalls 36b for proving an axial force transmitting capacity on the roller greater than the centering capacity of the ramp surfaces when the shift sleeve is moved toward an engaging position. The shift sleeve spline axially boarding the detent provides axially extending flat surfaces 36c for roller 58 to slide against.

When it is desired to couple either gear to the shaft, an appropriate and unshown shift mechanism is used. An example of such a mechanism is disclosed in U.S. Pat. No. 4,920,815 and incorporated herein by reference. The shift mechanism includes an unshown shift fork received in an annular recess 34a and operative to apply a shift force to move shift sleeve 34 axially from the neutral position along the axis of shaft 12 left to positive clutch gear 14 to shift 12 or right to positive clutch gear 16 the shaft. When one of the gears is to be declutched, the shift force moves the shift sleeve back to neutral. The shift mechanism may be manually moved by an operator through a linkage system, may be selectively moved by an actuator, or may be moved by means which automatically initiate shift mechanism movement and which also controls the magnitude of the force applied by the shift fork. When the shift fork is moved, pre-energizers 52 apply a pre-energizer force proportional to the shift force applied to the shift sleeve. Whether manually or automatically applied, the shift force is applied to the shift sleeve in an axial direction toward the gear to be engaged. The pre-energizer force, depending on direction of shift sleeve movement by the shift force, moves either friction surface 48 or 50 into initial engagement with its associated friction surface to clock the associated baulkring to a position relative to hub 32 for positioning the blocker surfaces for engagement in a known manner.

Figure 4:
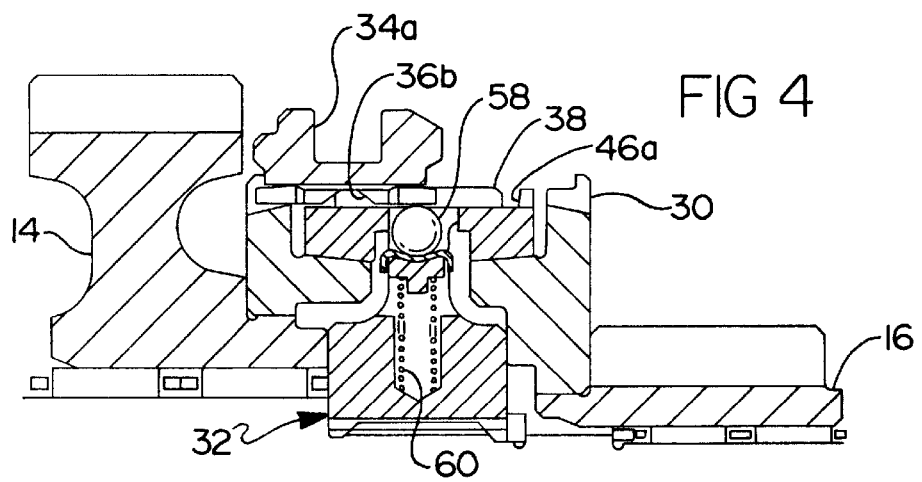

At the start of a shift from neutral, initial leftward axial movement of shift sleeve 34 by the shift force is transmitted by the pre-energizer rollers 58 to baulkring 40 via baulkring abutment surfaces 40a to effect initial frictional engagement of movable friction surface 48 with gear friction surface 24. The initial engagement force of the friction surfaces is, of course, a function of the force of springs 60 and the angles of the sidewalls 36b of detent 36a. The initial engagement of friction surface 48 causes an initial synchronizing torque to be transmitted across friction surfaces 48,24, assuming an asynchronous condition exists. This initial torque rotates baulkring 40 relative to the hub and shift sleeve enough to effect engagement of blocker surfaces 54a, 44a, thereby allowing transmission of the full force of the shift force directly across the engaged blocker surfaces for full synchronizing. As synchronization is approached, the shift force on the shift sleeve moves the baulkring blocker surfaces out of blocking engagement and the angled sidewall of each detent moves it's associated roller radially inward to allow the shift sleeve jaw teeth to move into engagement with the jaw teeth affixed to the gear 14 being synchronized, as shown in FIG. 4. During this movement the associated roller moves into sliding contact with one of the axially extending flat surfaces 36c. Synchronizer operation for synchronizing gear 16 is substantially the same.

Figure 3:
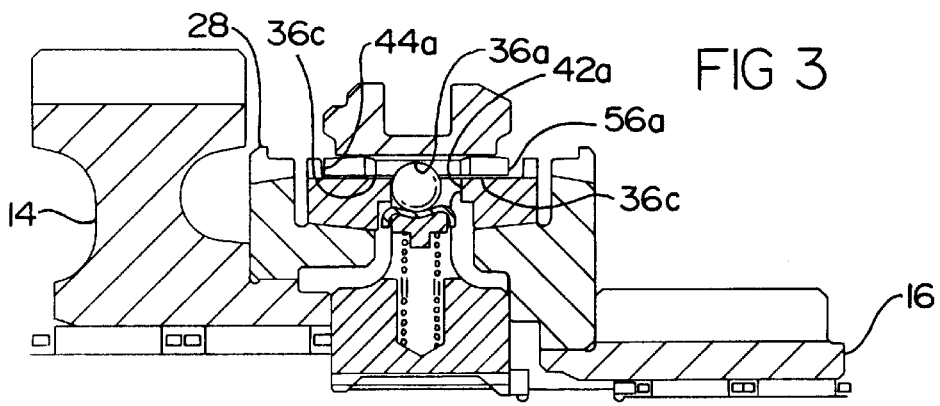
FIGS. 3–5 are partial views of the FIG. 1 synchronizer showing components therein in different positions.
Figure 5:
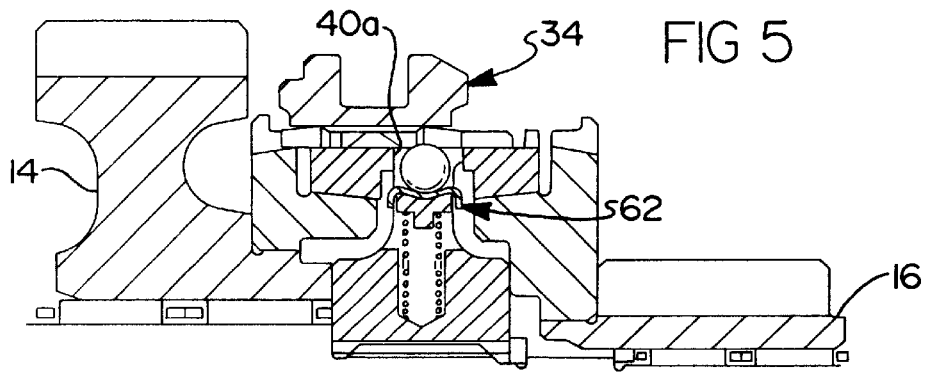
Figure 7:
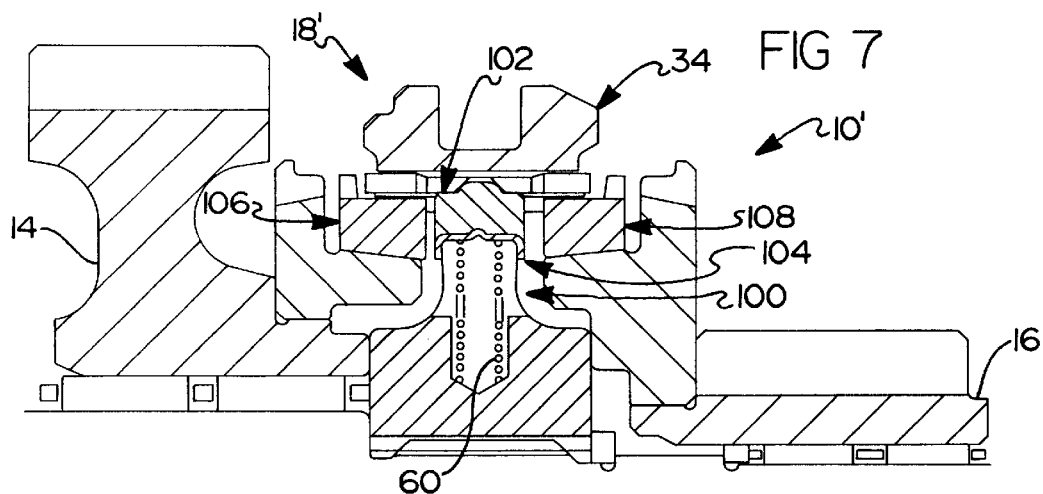
FIG. 7 is a partial sectional view of a second embodiment of the synchronizer.
Figure 11A:
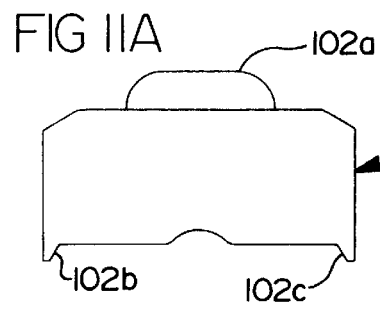
Figure 11B:
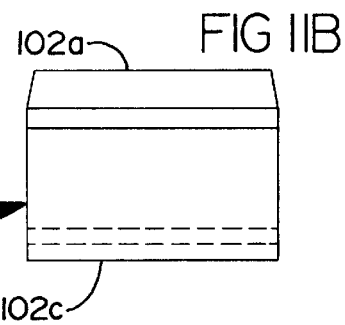
Figures 12A, 12B:
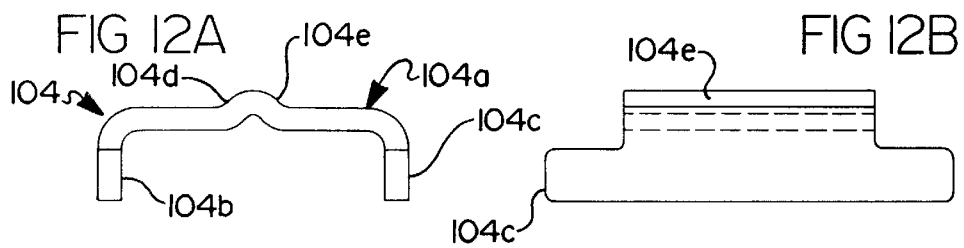
Figures 6A, 6B:
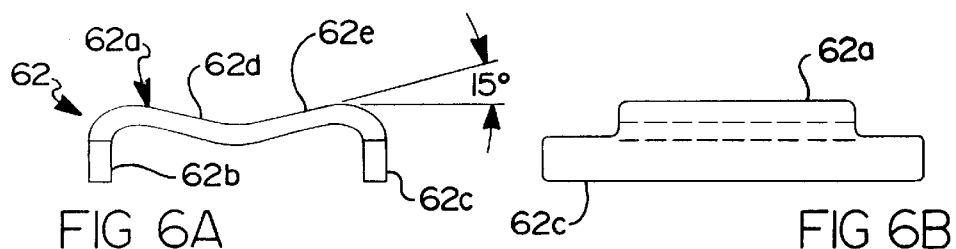
FIGS. 6A and 6B are enlarged views of a part in the synchronizer of FIGS. 1–5.

Looking further at pre-energizer 52 and operation thereof with respect to FIGS. 3–5, FIG. 3 shows initial leftward movement to synchronizer gear 14 with roller 58 acting against abutment 40a. FIG. 4 shows positive connection of the jaw teeth and roller 58 in contact with axially extending flat surfaces 36c. FIG. 5 shows the shift sleeve being returned to neutral and roller 58 centered by the centering forces of ramp surfaces 62d and 62e. The spacing between the roller and the baulkring abutments and any clearance between the spring holder tabs and the hub side walls is required to ensure movement the rollers on to ramp surfaces 62d before the rollers contact the baulkring abutments 40a in response to shift sleeve movement for synchronizing and positive clutching gear 14 to the shaft. The centering forces provided by the ramp surfaces on the rollers is, of course, always less than the force applied to the rollers by the angled sidewalls 36b of detent 36a. However, the centering forces provided by the ramps surfaces 62d, 62e on the rollers, when the shift sleeve is being moved rightward back to neutral, as in FIG. 5, is greater than the frictional forces between the rollers and the axially extending flat surfaces 36c. Hence, the centering forces prevent or restrict movement of the rollers on to the ramp surfaces 62e due to the friction forces, thereby preventing roller contact with abutment surfaces 42a and momentary engagement of friction surfaces 42,50 associated with reverse gear 16.

Looking now at FIGS. 7–12B, therein is shown a gear and synchronizer assembly 10' and a double acting baulkring-type synchronizer 18' that is the same as the gear and synchronizer assembly 10 and the double-acting baulkring-type synchronizer 18 with the exception of a pre-energizer 100 that differs from pre-energizer 52. Accordingly, all components in FIGS. 7–12B that are structurally the same as corresponding components in FIGS. 7–10 are given the same reference.

Figure 8:
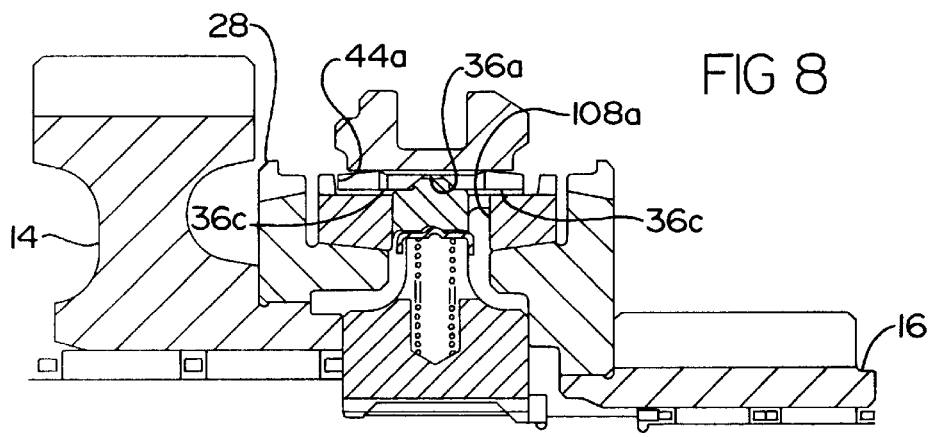
FIGS. 8–10 are views of the FIG. 7 synchronizer showing components therein in different positions.
Figure 9:
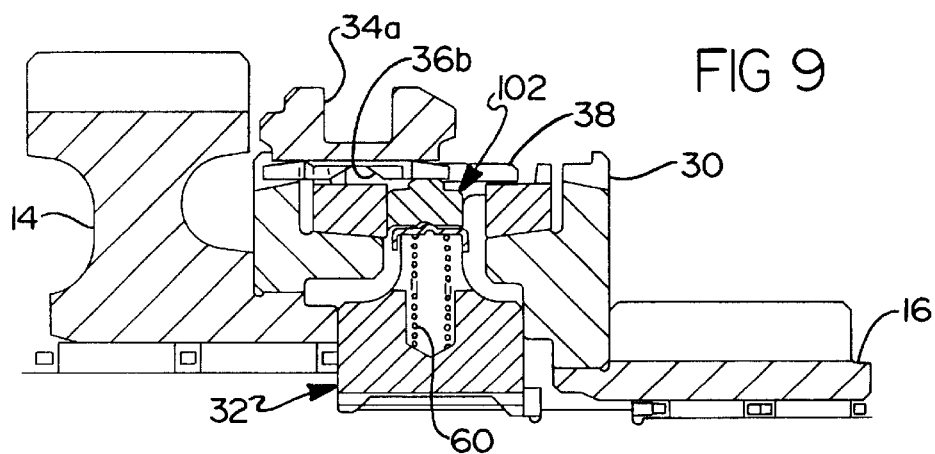

Each pre-energizer assembly 100 includes the detent 36a in one of the splines 36, a movable member or strut 102, the coil spring 60 disposed at one end in the blind bore 32b in the hub 32, a spring holder 104 disposed in the slot 66a in the hub web 66 and positioned between the movable member 102 and the other end of the spring 60, and baulkring abutment surfaces 106a, 108a, of baulkrings 106, 108. Baulkrings 106,108 differ from baulkrings 40, 42 only in that the abutment surfaces 106a, 108a are axially shortened due to the added axial length of strut 102. In a manner analogous to FIG. 1, strut 102 is axially spaced from the abutment surfaces 106a, 108a when the shift sleeve is in the neutral position of FIG. 7. The spring holder 104 which is also formed of sheet metal, includes a platform portion 104a extending axially through the slot 66a and tabs 104b, 104c defined by axially opposite ends of the platform extending radially inward by bending. The tabs embrace the web sidewalls 66b, 66c in snug sliding relation for preventing substantially all axial movement between the spring holder and the web. The platform portion has ramp surfaces 104d, 104e defined by a radially outwardly curved surface of relatively smooth profile when sectioned by a plane parallel to the axis and having a profile substantially parallel when sectioned to a plane normal to the axis. A radially outwardly facing part of strut 102 has a radially outwardly curved portion 102a received in detent 36a in a manner analogous to the radially outer surface of the roller 58. A radially inwardly facing part of strut 102 has a radially outwardly curved or concave surface that mates with ramp surfaces 104d, 104e to provide function analogous to roller 58 and ramp surfaces 62d, 62e. Axially opposite ends of the strut include skirt like portions 102b, 102c that cooperate with the surface of platform portion 104a as seen in FIGS. 8 and 9 to prevent tipping of the strut when it is moved axially. The force of the spring acting on the platform biases the strut radially outward into the detent when the shift sleeve is in the neutral position of FIG. 7. The ramp surfaces center the strut with a centering force determined by the angles of the ramp surfaces and the force of the spring. The detent angled sidewalls 36b for provide the axial force transmitting capacity on the strut that is greater than the centering capacity of the ramp surfaces when the shift sleeve is moved toward an engaging position. The shift sleeve spline axially boarding the detent provides the axially the extending flat surfaces 36c for strut curved portion 102a to slide on in a manner analogous to roller 58.

Figure 10:
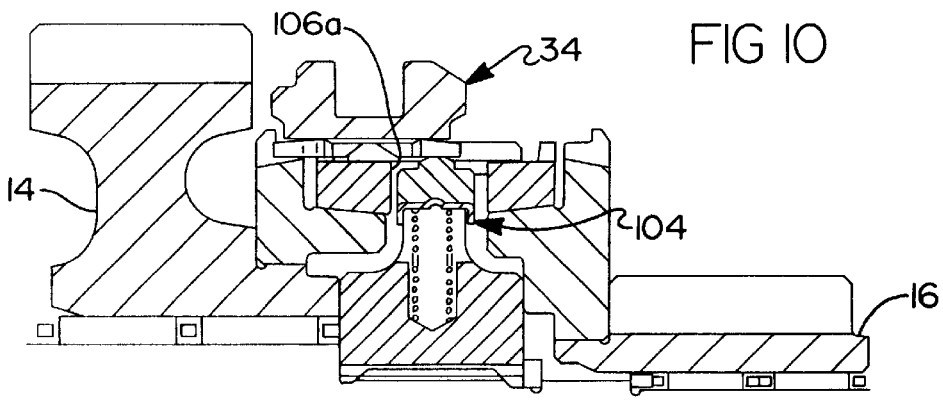

Looking now at pre-energizer 100 operation with respect to FIGS. 8–10, FIG. 8 shows initial leftward movement to synchronize gear 14 with strut 102 acting against baulkring abutment 106a. FIG. 9, shows positive connection of the jaw teeth and strut curved portion 102a in contact with axially extending flat surfaces 36c. FIG. 10 shows the shift sleeve being returned to neutral and strut 102 centered by the centering forces of ramp surfaces 104d, 104e. The spacing between the strut and the baulkring abutments and any clearance between the spring holder tabs and the hub side walls, as in the embodiment of FIGS. 1–6, is required to ensure movement of the strut on to ramp surfaces 104e before the struts contact the baulkring abutments 106a in response to shift sleeve movement for synchronizing and positive clutching gear 14 to the shaft. The centering forces provided by the ramp surfaces 104d, 104e on the struts is, of course, always less than the force applied to the struts by the angled sidewalls 36b of detent 36a. However, the centering forces provided by the ramp surfaces 104d, 104e on the struts, when the shift sleeve is being moved rightward back to neutral, as in FIG. 10, is always greater than the frictional forces between the curved portions 102a of the struts and the axially extending flat surfaces 36c. Hence, the centering forces prevent or restrict movement of the struts on to the ramp surfaces 104d due to the friction forces, thereby preventing strut contact with abutment surfaces abutment 108a and momentary engagement of friction surfaces 26, 50 associated with reverse gear 16.

Double acting synchronizers with improved pre-energizers has been disclosed. These pre-energizers may be used with synchronizers having self-energizing. The following claims are intended to cover the inventive portions of the disclosed synchronizers.

What is claimed is:

1. A double acting baulkring-type synchronizer (18) for selectively synchronizing and positive connecting a shaft (12) with either of axially spaced apart first and second drives (14, 16) disposed for relative rotation about an axis (12a) of the shaft (12) and axially fixed relative thereto; the synchronizer comprising:

a hub (32) affixed to the shaft (12) concentric to the axis (12a) and between the drives (14,16), the hub including a radially extending web (66) having axially oppositely facing sides walls (66b,66c), an outer circumference having external teeth (38), and a radially extending slot (66a) in the web extending through the outer circumference;

first and second jaw teeth (28, 30) and first and second friction surfaces (24,26) respectively affixed to the first and second drives (14,16);

a shift sleeve (34) having internal splines (36) slidably mating with the hub external splines (38) and third and fourth jaw teeth (54,56) respectively engagable with the first and second jaw teeth (28,30) in response respectively to first and second shift forces applying axially engaging movement of the shift sleeve (34) from a neutral position;

first and second baulkrings (40, 42 or 106,108) disposed on opposite sides of the web and respectively including third and fourth friction surfaces (48,50) respectively engagable with the first and second friction surfaces (24,26) to produce a synchronizing torque, and the first and second baulkrings respectively having first and second blocker surfaces (44a,46a);

third and fourth blocker surfaces (54a,56a) affixed axially relative to the shift sleeve (34);

pre-energizer means (52) for engaging the first and second friction surfaces (24,26) respectively with the third and fourth friction surfaces (48,50) in response to initial engaging movement of the shift sleeve (34) by the shift forces for positioning the first and second blocker surfaces (44a,46a) for engagement respectively with the third and fourth blocker surfaces (54a,56a) to prevent asynchronous engagement of the first and second jaw teeth (28,30) respectively with the third and fourth jaw teeth (54,56), the pre-energizer means including a movable member (58) axially disposed between first and second baulkring abutments (40a, 42a) and biased radially outward by spring means (60) into a detent (36a) in the shift sleeve (34) when the shift sleeve is in the neutral position, the detent axially disposed between axially extending surfaces (36c) of the shift sleeve, a spring holder (62) disposed in the slot (66a) between the member (58) and spring means (60) and having tabs (62b,62c) slidably disposed on opposite sides of the web (66) and having ramp surfaces (62d,62e) for centering the member (58) thereon with a centering force determined by the ramp surfaces and the force of the spring means, the detent (36a) and ramp surfaces (62d,62e) acting on the member (58) for resiliently holding the shift sleeve (34) in the neutral position, the detent having angled sidewalls (36b) for moving the member axially into contact with the first and second abutments (40a,42a) in response respectively to the initial engaging movement of the shift sleeve (34) with a force transmitting capacity greater than the centering capacity of the ramp surfaces and to move the member radially inward and onto either one of the axially extending surfaces (36c) to allow continued engaging movement of the shift sleeve for engaging the first and second jaw teeth (28,30) respectively with the third and fourth jaw teeth (54,56) in response to synchronization between one of the drives (14,16) and the shaft (12); characterized by:

the spring holder (62) including a platform portion (62a) disposed in and extending axially through the slot (66a) and the tabs (62b,62c) embracing the web sidewalls (66b,66c) in snug sliding relation, the member (58) having axial spacing from the first and second abutments (40a,42a) during the neutral position of shift sleeve (34), and the centering force provided by ramp surfaces (62d,62e) and the axial spacing being great enough to prevent movement of the member (58) into friction clutch engagement movement with the second abutment (42a) and prevent momentary engagement of the friction surfaces (24,48) associated with the second drive (14) during disengagement of the first drive (16) due to frictional forces between the member (58) and the axially extending surfaces (36c) when the shift sleeve (34) is moved toward the neutral position from a jaw teeth engaged position of the first drive (16).

2. The synchronizer of claim 1, wherein:
the tabs are defined by axially opposite ends of the platform extending radially inward there-from.

3. The synchronizer of claim 2, wherein:
the platform has a radially inwardly curved surface defining the ramp surfaces and the member has a round profile disposed in a radially inner most part of the curved surface when the shift sleeve is in the neutral position.

4. The synchronizer of claim 3, wherein:
a cross section of the radially inwardly curved surface is substantially parallel to a plane normal to the axis, and the member is a roller.

5. The synchronizer of claim 4, wherein:
the radially inwardly curved surface is a smooth curve.

6. The synchronizer of claim 5, wherein:
the spring holder is a sheet metal stamping.

7. The synchronizer of claim 2, wherein:
the platform has a radially outwardly curved surface defining the ramp surfaces and the member has a curved surface mating with the ramp surfaces when the shift sleeve (34) is in the neutral position.

8. The synchronizer of claim 7, wherein:
the spring holder is a sheet metal stamping.

9. The synchronizer of claim 8, wherein:
axially opposite ends of the member includes skirt like portions that cooperate with the surface of the platform portion to prevent tipping of the member when the member is moved axially.

10. The synchronizer of claim 1, 2, 3, 4, 5, 6, 7, 8 or 9, wherein:
one drive is a forward drive and the other drive is a reverse drive.

11. A double acting baulkring-type synchronizer for selectively synchronizing and positive connecting a shaft with either of axially spaced apart first and second drives disposed for relative rotation about an axis of the shaft and axially fixed relative thereto; the synchronizer comprising:

a hub affixed to the shaft concentric to the axis and between the drives, the hub including a radially extending web having axially oppositely facing sides walls, an outer circumference having external teeth, and a radially extending slot in the web extending through the outer circumference;

first and second jaw teeth and first and second friction surfaces respectively affixed to the first and second drives;

a shift sleeve having internal splines slidably mating with the hub external splines and third and fourth jaw teeth respectively engagable with the first and second jaw teeth in response respectively to first and second shift forces applying axially engaging movement of the shift sleeve from a neutral position;

first and second baulkrings disposed on opposite sides of the web and respectively including third and fourth friction surfaces respectively engagable with the first and second friction surfaces to produce a synchronizing torque, and the first and second baulkrings respectively having first and second blocker surfaces;

third and fourth blocker surfaces affixed axially relative to the shift sleeve;

pre-energizer means for engaging the first and second friction surfaces respectively with the third and fourth friction surfaces in response to initial engaging movement of the shift sleeve by the shift forces for positioning the first and second blocker surfaces for engagement respectively with the third and fourth blocker surfaces to prevent asynchronous engagement of the first and second jaw teeth respectively with the third and fourth jaw teeth, the pre-energizer means including a movable member axially disposed between first and second baulkring abutments and biased radially outward by spring means into a detent in the shift sleeve when the shift sleeve is in the neutral position, the detent axially disposed between axially extending surfaces of the shift sleeve, a spring holder disposed in the slot between the member and spring means and having tabs slidably disposed on opposite sides of the web and having ramp surfaces for centering the member thereon with a centering force determined by the ramp surfaces and the force of the spring means, the detent and ramp surfaces acting on the member for resiliently holding the shift sleeve in the neutral position, the detent having angled sidewalls for moving the member axially into contact with the first and second abutments in response respectively to the initial engaging movement of the shift sleeve with a force transmitting capacity greater than the centering capacity of the ramp surfaces and to move the member radially inward and onto either one of the axially extending surfaces to allow continued engaging movement of the shift sleeve for engaging the first and second jaw teeth respectively with the third and fourth jaw teeth in response to synchronization between one of the drives and the shaft;

the spring holder including a platform disposed in and extending axially through the slot, the tabs being defined by axially opposite ends of the platform extending radially inward there-from and embracing the web sidewalls in snug sliding relation, the member having axial spacing from the first and second abutments during the neutral position of shift sleeve, and the centering force provided by the ramp surfaces and the axial spacing being great enough to prevent movement of the member into engagement with the second abutment due to frictional forces between the member and the axially extending surfaces when the shift sleeve is moved toward the neutral position from an jaw teeth associated engaged position; and the platform has a radially outwardly curved surface defining the ramp surfaces and the member has a curved surface mating with the ramp surfaces when the shift sleeve (34) is in the neutral position.

12. The synchronizer of claim 11, wherein:

the spring holder is a sheet metal stamping.

13. The synchronizer of claim 12, wherein:

axially opposite ends of the member includes skirt like portions that cooperate with the surface of the plafform portion to prevent tipping of the member when the member is moved axially.

14. The synchronizer of claim 11, wherein:

one drive is a forward drive and the other drive is a reverse drive.

\* \* \* \* \*